United States Patent

Raychaudhuri et al.

Patent Number: 5,972,458
Date of Patent: Oct. 26, 1999

[54] OPTICAL RECORDING ELEMENT WITH AN INTERFACIAL LAYER BETWEEN THE RECORDING LAYER AND THE REFLECTING LAYER

[75] Inventors: Pranab K. Raychaudhuri, Rochester; Fridrich Vazan, Pittsford, both of N.Y.

[73] Assignee: Eastman Kodak Company, Rochester, N.Y.

[21] Appl. No.: 09/053,476

[22] Filed: Apr. 1, 1998

[51] Int. Cl.$^6$ ............................................. B32B 3/00
[52] U.S. Cl. ..................... 428/64.1; 428/64.4; 428/64.5; 428/64.6; 428/913; 430/270.13; 430/495.1; 430/945; 369/283; 369/288
[58] Field of Search ..................... 428/64.1, 64.2, 428/64.4, 64.5, 64.6, 412, 457, 913; 430/270.11, 270.13, 495.1, 945; 369/283, 288

[56] References Cited

U.S. PATENT DOCUMENTS 5,585,158  12/1996  Raychaudhuri et al. .
5,733,623   3/1998  Raychaudhuri et al. .............. 428/64.1
5,843,553  12/1998  Olin et al. ................................ 428/64.1

*Primary Examiner*—Elizabeth Evans
*Attorney, Agent, or Firm*—Raymond L. Owens

[57] ABSTRACT

A recordable element includes a substrate, an optical recording layer deposited on the substrate, a light reflecting layer deposited over the recording layer and an interfacial layer having a thickness in a range of 3 to 30 nm and interposed between the recording layer and the reflective layer, the optical recording layer containing $Te_a Ge_b C_c H_d O_e$ where a, b, c, d, and e are the atomic percents such that $a+b+c+d+e=100$, and wherein $10<a<40$, $10<b<60$, $5<c<35$, $10<d<35$, $e \geq 0$; and the interfacial layer containing $Ge_w C_x H_y O_z$ where w, x, y, and z are atomic percents such that $w+x+y+z=100$, and wherein $15<w<65$, $5<x<35$, $15<y<40$, $z \geq 0$. The recording element has its properties changed by heat treatment for a time and temperature selected so as to improve and stabilize its performance.

23 Claims, 3 Drawing Sheets

5,972,458

OPTICAL RECORDING ELEMENT WITH AN INTERFACIAL LAYER BETWEEN THE RECORDING LAYER AND THE REFLECTING LAYER

CROSS REFERENCE TO RELATED APPLICATIONS

Reference is made to commonly-assigned U.S. patent application Ser. Nos. 08/631,352 filed April 12, 1996, entitled "A Method of Forming Recordable Optical Element Using Low Absorption Materials" by Raychaudhuri et al; 08/631,754 filed Apr. 12, 1996, entitled "A Method of Forming Recordable Optical Element Using Low Absorption Material" by Raychaudhuri et al; 08/732,825 filed Oct. 15, 1996, entitled "Recording Media for Recordable Element" by Raychaudhuri et al; and 08/902,544, filed Jul. 29, 1997, entitled "High Performance Media for Optical Recording" by Olin et al, the disclosures of which are incorporated herein by reference.

FIELD OF THE INVENTION

The present invention relates to recordable elements for optical storage.

BACKGROUND OF THE INVENTION

Since its introduction in the early 80's the compact disc (CD) has firmly established as a popular format for digital optical storage. The digital versatile disc, also known as the digital video disc (DVD) is now emerging as a versatile medium and is believed to eventually replace the CD. The capacity of a DVD is seven times that of the CD. The increased capacity is primarily achieved through the use of shorter wavelength laser and narrower track-pitch. However, because of their very strong wavelength dependence, dyes for recordable CD (CD-R) application at 780 nm are not generally extendible to recordable DVD (DVD-R) that operates around 635 nm wavelength.

It has been disclosed in commonly-assigned U.S. Patent No. 5,585,158 and U.S. patent application Ser. Nos. 08/631,352 filed Apr. 12, 1996, entitled "A Method of Forming Recordable Optical Element Using Low Absorption Materials" by Raychaudhuri et al; 08/631,754 filed Apr. 12, 1996, entitled "A Method of Forming Recordable Optical Element Using Low Absorption Material" by Raychaudhuri et al; 08/732,825 filed Oct. 15, 1996, entitled "Recording Media for Recordable Element" by Raychaudhuri et al; and 08/902, 544, filed Jul. 29, 1997, entitled "High Performance Media for Optical Recording" by Olin et al, that optical recording thin layers based on the Ge—Te—C—H—O system can be appropriate as recording layers in CD-R optical recording elements. These layers exhibit a weak dependence of optical properties to wavelength, and with only minor alteration of composition and thickness believed usable as DVD-R optical recording elements as well.

Optical recording elements were fabricated of optical recording thin layers comprising one or more sublayers each containing the said components with a reflector layer of gold and a protective overcoat as shown in FIG. 1. The composition and thickness of each of the sublayers being selected to approximately correspond to the $R_{min}$ reflectivity and further having the optical recording elements properties modified by heat treatment. The optical recording elements thus prepared have been reported applicable to CD-R and also believed useful in DVD-R applications.

Since CD-R and DVD-R are aimed at the consumer market it is highly desirable to reduce cost. While attempting to replace the reflecting layer of gold with less expensive metals, it was found that silver provided the required reflectivity that appeared stable at room temperature. At elevated temperature aging, near 95° C., the reflectivity of disc (measured through the substrate) decreased while the reflectivity of Ag (measured through transparent protective overcoat) stayed unchanged. This indicates that the interaction at the recording layer/silver interface is the main cause of instability.

SUMMARY OF THE INVENTION

Therefore it is an object of this invention to provide stable optical recording element utilizing inexpensive reflector useful as CD-R and DVD-R.

This object is achieved by a recordable element comprising:

(a) a substrate, an optical recording layer deposited on the substrate, a light reflecting layer deposited over the recording layer and an interfacial layer having a thickness in a range of 3 to 30 nm and interposed between the recording layer and the reflective layer, the optical recording layer containing $Te_aGe_bC_cH_dO_e$ where a, b, c, d, and e are the atomic percents such that a+b+c+d+e=100, and wherein 10<a<40, 10<b<60, 5<c<35, 10<d<35, e≧0; and the interfacial layer containing $Ge_wC_xH_yO_z$ where w, x, y, and z are atomic percents such that w+x+y+z=100, and wherein 15<w<65, 5<x<35, 15<y<40, z≧0; and (b) the recording element having its properties changed by heat treatment for a time and temperature selected so as to improve and stabilize its performance.

The optical recording elements produced in accordance with the present invention have improved performance parameters including enhanced stability of reflectivity on thermal aging. Unexpectedly, it was discovered that in the present DVD-R structure Ag provide about 10 percentage points higher reflectivity than the control DVD-R disk (gold reflector with no interfacial layer) and permits easier accessibility to DVD-R specification for reflectivity.

DETAILED DESCRIPTION OF THE INVENTION

Figure 2:
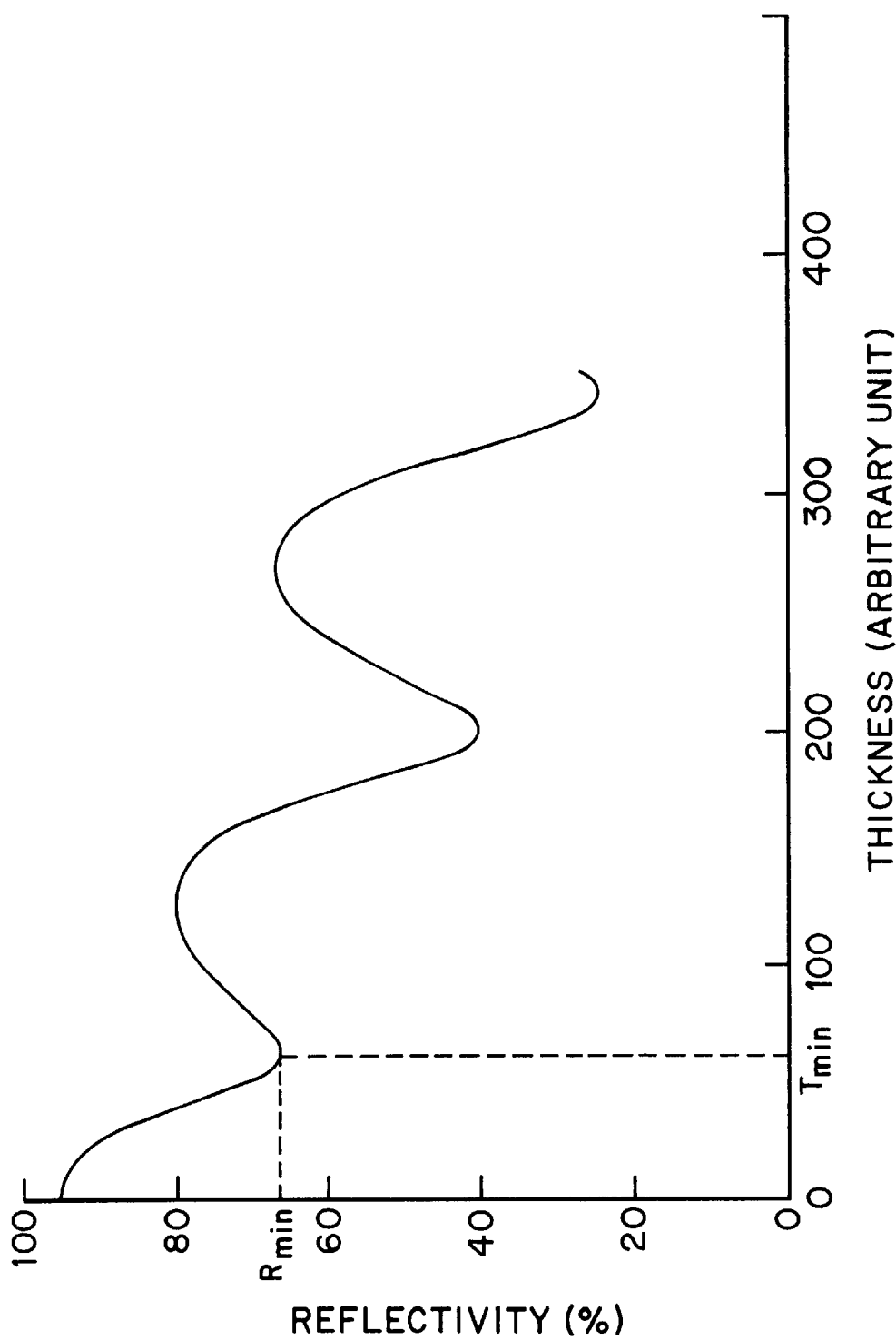
FIG. 2 is a plot of the reflectance of a recording element versus thickness of the recording layer.

It is an important feature of the present invention that the interfacial layer being selected not to adversely affect the reflectivity and be non-reacting to both recording layer and reflecting layer. Although it is desirable to have a transparent interfacial layer, there may be some minor amount of absorption which will not adversely affect the operation of the recording element. The thickness of the recording layer is further selected such that the element reflectivity is near to the $R_{min}$. The use of the term "near to the $R_{min}$" means that it is within±30% of the thickness corresponding to $R_{min}$. The term $R_{min}$ is well understood in the literature. FIG. 2 shows a representative plot of reflectance as a function of recording layer thickness of a recording element. The recording element for FIG. 2 includes a semi-transparent recording layer deposited on a polycarbonate substrate and a gold reflecting layer deposited on the recording layer. The reflectance plotted in FIG. 2 is determined at 780 nm wavelength and is measured through the substrate. The optical properties of the recording layer and the unit of its thickness in this plot are arbitrary. However, the curve is representative of recording elements of this type. Starting from its maximum value the reflectivity goes down with increasing thickness to its minimum value then ascends to another maximum value before descending again, thus generating infinite number of local minima and maxima due to optical interference effect. The local minimum that resulted at the lowest recording layer thickness is the first reflectivity minimum, hereafter referred to as $R_{min}$. The thickness corresponding to $R_{min}$ for the purpose of discussion is termed $T_{min}$. Preferably, the thickness of the optical recording is selected to be near $T_{min}$. With reference to FIG. 2, $R_{min}$ is about 66% and $T_{min}$ is about 58 thickness units. It should be pointed out that the $R_{min}$ and the $T_{min}$ will be different from those shown in FIG. 2 when composition and/or measuring wavelength is altered although the nature of the plot will remain similar. Those skilled in the art will recognize that the $R_{min}$ can be tailored by selecting the optical constants and/or adjusting the parameters that influence the optical properties of the deposited recording layer.

Optical recording elements have been made using Au and Ag reflecting layers with and without interfacial layer over identical recording layers of a thickness near $T_{min}$. It has been discovered that a Ge—C—H—O interfacial thin layer acted as an effective barrier layer. It has been determined that the interfacial layer preferably has a thickness in the range of 3 to 30 nm. The interfacial layer should be substantially transparent, which means it has an inconsequential amount of laser light absorption at the wavelengths of interest. While the optical recording elements reflectivity with Ag reflecting layer with no interfacial layer degraded on thermal aging, those with the said interfacial layer exhibited no degradation. Quite unexpectedly also discovered that optical recording elements reflectivity at 635 nm with Ag reflecting layer and the interfacial layer exhibited a 10 percent point increase over the control disc (disc with Au reflecting layer and no interfacial layer). Those skilled in the art will appreciate that the reflecting layer can be made of Au, Ag, Cu, or Al and their alloys.

Figure 1:
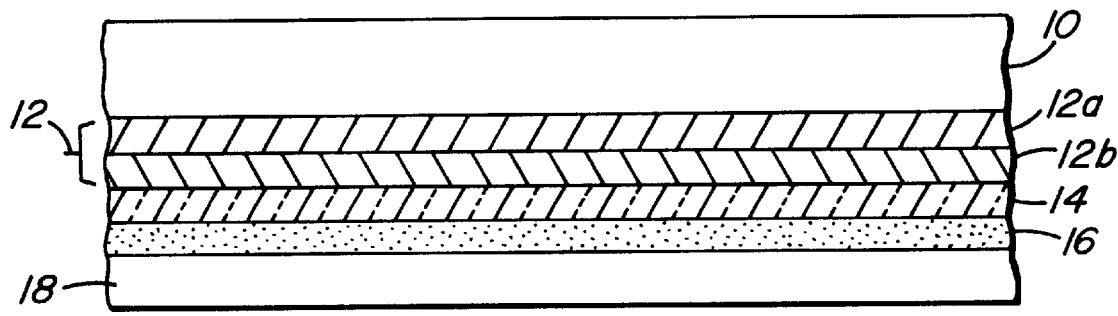
FIG. 1 is a schematic representation, in cross-section, of an optical recording element in accordance with the invention.

An optical recording element is shown in FIG. 1. The substrate 10 has thereon, a recording layer 12, an interfacial layer 14 and a reflecting layer 16 and an protective overcoat 18. The thickness of the optical recording layer 12 is selected to be near $T_{min}$. The protective overcoat is not a functional layer for recording and hence forward will not be discussed.

Recording is accomplished by marking the recording layer 12 with a write laser focused on the recording layer 12. The focused laser beam heats the recording layer 12 to temperatures substantially above the room temperature and induces physical changes in the optical recording elements. The likely changes may include agglomeration of the metallic components in the layer, or the dissociation of material to form gaseous species which, in turn, causes the deformation of the optical recording elements in the form of bubbles, voids, or pits, etc. Some distortion of the substrate material might also be induced. In any event, the combination of some or all of these changes forms marks which can then be read back by the focused read laser beam.

For a detailed description of the optical recording and play back processes as well as the construction of optical discs, see *Optical Recording*, Allan B. Marchant (1990).

The Substrate

The substrate 10 can be made from optically transparent resins with or without surface treatment. The substrate is transparent and light which illuminates the recording layer 12 passes through the substrate 10. The preferred resins for the FIG. 1 embodiment were polycarbonate or polyacrylate. The substrate 10 may include a guide groove for laser tracking.

The Recording Layer 12

The present invention uses a sputtered layer containing $Te_aGe_bC_cH_dO_e$ where a, b, c, d, and e are atomic percents such that a+b+c+d+e=100, and wherein 10<a<40, 10<b<60, 5<c<35, 10<d<35, e≧0. The preferred recording layer 12 can include a plurality of layers. Two layers are shown and they will be referred to as sublayers 12a and 12b. The practiced method of recording layer deposition was the DC reactive sputtering. An alloy sputtering method can also be used wherein a single target contains both Te and Ge. Alloy targets can be prepared by melt casting or powder metallurgy techniques. The recording layer 12 can also be deposited by cosputtering wherein each target is constituted of a single element. The atmosphere contains a sputter gas such as Ar or Kr, and a reactive gas such as methane, acetylene, and other hydrocarbons. Useful layers can also be prepared using other gases such as $H_2$, $CO_2$ etc. In the preferred embodiment the sublayer 12a is deposited on the substrate 10 under a low flow rate of $CH_4$ for a predetermined time, after which the sublayer 12b having different composition than sublayer 12a is deposited using a higher flow rate on sublayer 12a. In other words, the portion of the recording layer 12 adjacent to the interfacial layer 14 has higher hydrocarbon content than the portion of the recording layer 12 adjacent to the substrate 10. Preferably sublayer 12b is formed with a increased flow rate of $CH_4$. The combined layer 12 is such that its thickness is near $T_{min}$. The recording layer 12 can also have the composition graded along its thickness with hydrocarbon component of the sputtering gas being gradually increased as the deposition continues. In such a case, the recording layer 12 is continuously graded along its thickness and contains $Te_aGe_bC_cH_dO_e$ where a, b, c, d, and e are the atomic percents such that a+b+c+d+e=100, and wherein 10<a<40, 10<b<60, 5<c<35, 10<d<35, e≧0.

The Interfacial Layer 14

The present invention uses an interfacial layer 14 containing $Ge_wC_xH_yO_z$ where w, x, y, and z are atomic percents such that w+x+y+z=100, and wherein 15<w<65, 5<x<35, 15<y<40, z≧0. The method of dep of the interfacial layer 14 was the DC reactive sputtering from a Ge target. The atmosphere contains a sputter gas such as Ar or Kr, and a reactive gas such as methane, acetylene, and other hydrocarbons. Useful interfacial layers 14 can also be prepared using other gases such as $H_2$, $CO_2$ etc. In the preferred embodiment the interfacial layer 14 is substantially transparent ranging in thickness from 3 to 30 nm.

The Reflective Layer 16

The reflective layer 16 can be made of any of the high reflectivity metals and alloys. Useful layers can be vacuum deposited or sputtered. The preferred reflecting layer 16 was a 70 nm Ag although gold is most commonly used.

The Protective Overcoat Layer 18

The overcoat layer 18 can be made any of any of the materials that is stable and non reacting to the reflecting layer. Examples of such materials are UV-curable resins and adhesives several micron thick.

Heat Treatment

The recording element can be heat treated. The recording element can have its properties improved by heating. The heat treatments are performed in air oven at a temperature above 50° C. for a period of at least 4 hours. Benefits are generally improved at more elevated temperature and longer periods of time. The temperature and time of heat treating are limited by plasterizing of polycarbonate substrate and the reaction with the reflective layer 16. The following table shows examples of heat treatment of different discs for different times at 95° C.

TABLE 1

| Disc | Interface thickness (nm) | Reflector | % R @ 1 day | % R @ 2 day | % R @ 3 day | % R @ 6 day | % R @ 7 day | % R @ 12 day |
|---|---|---|---|---|---|---|---|---|
| 1 | 12.6 | Ag | 53.1 | 53 | 52.9 | 53.8 | 53.7 | 53.9 |
| 2 | 8.4 | Ag | 52.1 | 52.8 | 51.7 | 52.0 | 51.4 | 52.8 |
| 3 | 6.3 | Ag | 51.7 | 52.1 | 49.9 | 51.0 | 52.1 | 52.3 |
| 4 | 4.2 | Ag | 51.6 | 52.1 | 34 | 34.1 | 33.4 | 34.0 |
| 5 | 4.2 | Ag | 53 | 53.9 | 33.8 | 33.8 | 33.4 | 33.3 |
| 6 | 2.1 | Ag | 43.9 | 41.8 | 32 | 32.8 | 31.8 | 32.0 |
| 7 | 2.1 | Ag | 42.5 | 40 | 33.1 | 33.9 | 32.1 | 32.3 |
| 8 | 0 | Ag | 31.2 | 30.4 | 29.6 | 30.1 | 29.6 | 29.4 |
| 9 | 0 | Ag | 31.8 | 30.4 | 29.8 | 30.4 | 29.8 | 30.0 |
| 10 | 0 | Ag | 31.2 | 31.1 | 30.5 | 30.7 | 30.3 | 30.6 |
| 11 | 0 | Au | 39.9 | 41.1 | 40.8 | 43.7 | 43.2 | 44.6 |
| 12 | 0 | Au | 39.9 | 41.3 | 40.7 | 43.4 | 43.5 | 44.6 |
| 13 | 0 | Au | 39.7 | 41.1 | 40.6 | 43.2 | 43.4 | 44.4 |
| 14 | 0 | Au | 40.6 | 42.1 | 41.5 | 44.3 | 43.6 | 45.6 |

EXAMPLES

Fourteen discs using an identical structure and process were prepared with each having a thickness substantially equal $T_{min}$ for 635 nm application. These recording layers were deposited in quick sequence on grooved polycarbonate disc substrates under the following preparation conditions:

Preparation Conditions

Recording Layer: sublayer 12a

Power input to each of the two Te targets (WTe)—40 Watts

Power input to each of the two Ge targets (WGe)—180 Watts

Flow rate of Ar—13.3 SCCM (standard cubic centimeters per second).

Flow rate of $CH_4$ —6.0 SCCM

Deposition time—3.5 seconds

Recording Layer: sublayer 12b

Power input to each of the two Te targets (WTe)—40 Watts

Power input to each of the two Ge targets (WGe)—180 Watts

Flow rate of Ar—13.3 SCCM (standard cubic centimeters per second)

Flow rate of $CH_4$ —10.0 SCCM

Deposition time—7.0 seconds

These 14 discs were split in to three groups:

Group 1. —Disc number#1, 12, 13 and 14 are Au control discs. The discs were provided with sputtered reflective layers of gold, 700 A thick.

Group 2. —Disc number#8, 9, and 10 are Ag control discs. The discs were provided were with sputtered reflective layers of silver, 700 A thick.

Group 3. —Disc number#1 through 7 were fabricated with varying thickness of the interfacial layer and an identical sputtered reflective layers of silver, 700 A thick. Group 3 discs were provided with interfacial layers that were deposited using a separate coater under the following conditions:

Power input to the Ge target (WGe)—35 Watts

Flow rate of Ar—18.0 SCCM.

Flow rate of $CH_4$ —7.0 SCCM

Deposition time—30, 20,15, 10, and 5 seconds.

The calibrated thickness of the interfacial layers were 12.6 nm for disc #1; 8.4 nm for disc#2; 6.3 nm for disc#3; 4.2 nm for disc #4 and 5; 2.1 nm for disc#6 and 7.

Figure 3:
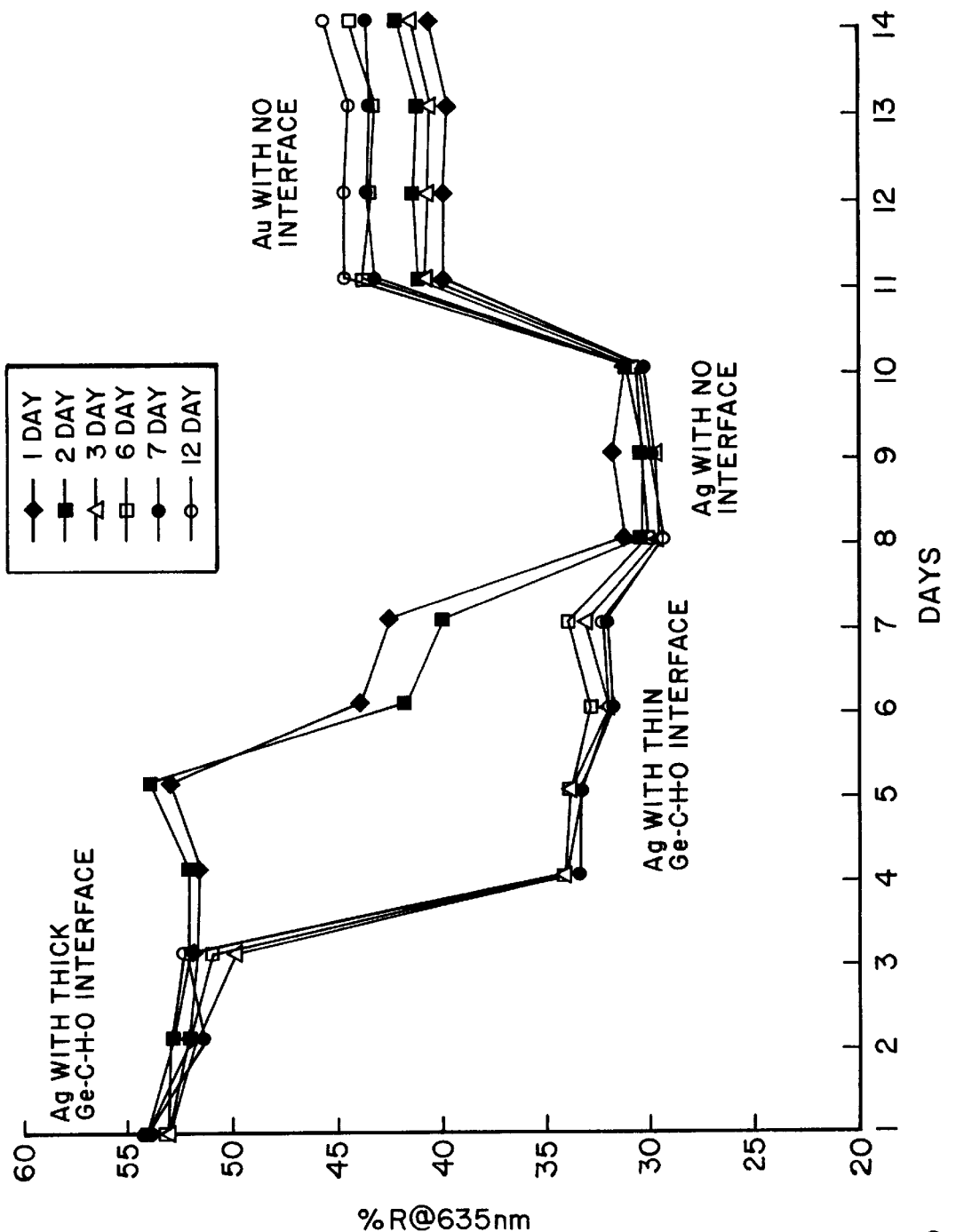
FIG. 3 is a plot showing the reflectivity as a function of thermal aging of the recording elements of the present invention and Au and Ag control discs.

None of the 14 discs were provided with any protective coatings. The discs were heat treated in 95° C. for a day. Stability of the discs was determined by aging them in an air oven and periodically taking out the discs and measuring the reflectivity at 635 nm using a spectrophotometer. Referring to FIG. 3 (see also Table 1), there is shown the percent reflectivity at 635 nm as a function of thermal aging at 95° C. for the three groups of discs. The aging data included an one day (day 3) incubation at 80° C. and 85% RH. These data show that the reflectivity of group 1 discs (control discs using a Au reflecting layer without an interfacial layer) increases gently with aging while the opposite is true for the group 2 discs—Ag control discs. At one day aging the reflectivity of Ag control discs are about 8 to 9 percentage point lower than that of the Au control discs. On the basis of optical constants the reflectivity of Ag control discs were expected to be higher than the Au control discs. The fact that it is not suggests that Ag discs have degraded significantly in one day's of aging. Group 3 discs with thin interfacial layer, up to 4.2 nm initially exhibited high reflectivity but degraded continuously with aging. Their reflectivity became virtually identical to that of the Ag control discs indicating that thin interfacial layers are ineffective. However, Series 3 discs with thick interfacial layer of 6.3 nm and beyond retained the reflectivity even after 12 days of aging. The data also show that these discs have significantly higher reflectivity than the Au control discs which is considered another advantage.

The recording elements with interfacial layers having a thickness in a range of 3 to 30 nm clearly have their properties changed by heat treatment for a time and temperature selected so as to improve and stabilize its performance.

The invention has been described in detail with particular reference to certain preferred embodiments thereof, but it will be understood that variations, extensions and modifications can be effected within the spirit and scope of the invention.

| PARTS LIST | |
|---|---|
| 10 | substrate |
| 12a | sublayer |
| 12b | sublayer |
| 14 | interfacial layer |
| 16 | reflecting layer |
| 18 | overcoat layer |

What is claimed is:

1. A recordable element comprising:

(a) a substrate, an optical recording layer deposited on the substrate, a light reflecting layer deposited over the recording layer and an interfacial layer having a thickness in a range of 3 to 30 nm and interposed between the recording layer and the reflective layer, the optical recording layer containing $Te_aGe_bC_cH_dO_e$ where a, b, c, d, and e are the atomic percents such that a+b+c+d+e=100, and wherein 10<a<40, 10<b<60, 5<c<35, $10 < d < 35$, $e \geq 0$; and the interfacial layer containing $Ge_w C_x H_y O_z$ where w, x, y, and z are atomic percents such that $w+x+y+z=100$, and wherein $15 < w < 65$, $5 < x < 35$, $15 < y < 40$, $z \geq 0$; and (b) the recording element having its properties changed by heat treatment for a time and temperature selected so as to improve and stabilize its performance.

2. The recordable element of claim 1 where the interfacial layer has thickness in the range of 3 to 30 nm.

3. The recordable element of claim 1 where the interfacial layer is substantially transparent.

4. The recordable element of claim 1 where the optical recording layer thickness is within±30% of the thickness corresponding to $R_{min}$.

5. The recordable element of claim 1 where the reflective layer includes Au, Ag, Cu, or Al and their alloys.

6. A recordable element comprising:

(a) a substrate, an optical recording layer deposited on the substrate, a light reflecting layer deposited over the recording layer and an interfacial layer having a thickness in a range of 3 to 30 nm and interposed between the recording layer and the reflective layer, wherein the recording layer includes a plurality of sublayers each containing $Te_a Ge_b C_c H_d O_e$ where a, b, c, d, and e are the atomic percents such that $a+b+c+d+e=100$, and wherein $10 < a < 40$, $10 < b < 60$, $5 < c < 35$, $10 < d < 35$, $e \geq 0$; and the interfacial layer containing $Ge_w C_x H_y O_z$ where w, x, y, and z are atomic percents such that $w+x+y+z=100$, and wherein $15 < w < 65$, $5 < x < 35$, $15 < y < 40$, $z \geq 0$; and (b) the recording element having its properties changed by heat treatment for a time and temperature selected so as to improve and stabilize its performance.

7. The recordable element of claim 6 wherein the sublayers can have different optical and thermal properties.

8. The recordable element of claim 6 wherein the sublayer adjacent to the interfacial layer has higher hydrocarbon content than the sublayer adjacent to the substrate.

9. A recordable element comprising:

(a) a substrate, an optical recording layer deposited on the substrate, a light reflecting layer deposited over the recording layer and an interfacial layer having a thickness in a range of 3 to 30 nm and interposed between the recording layer and the reflective layer, wherein the recording layer is continuously graded along its thickness and contains $Te_a Ge_b C_c H_d O_e$ where a, b, c, d, and e are the atomic percents such that $a+b+c+d+e=100$, and wherein $10 < a < 40$, $10 < b < 60$, $5 < c < 35$, $10 < d < 35$, $e \geq 0$; and the interfacial layer containing $Ge_w C_x H_y O_z$ where w, x, y, and z are atomic percents such that $w+x+y+z=100$, and wherein $15 < w < 65$, $5 < x < 35$, $15 < y < 40$, $z \geq 0$; and (b) the recording element having its properties changed by heat treatment for a time and temperature selected so as to improve and stabilize its performance.

10. The recordable element of claim 9 wherein the portion of the recording layer adjacent to the interfacial layer has higher hydrocarbon content than the portion of the recording layer adjacent to the substrate.

11. The recordable element of claim 9 where the interfacial layer has thickness in the range of 3 to 30 nm.

12. The recordable element of claim 9 where the interfacial layer is substantially transparent.

13. The recordable element of claim 9 where the optical recording layer thickness is within±30% of the thickness corresponding to $R_{min}$.

14. The recordable element of claim 9 wherein the sublayer adjacent to the interfacial layer has higher hydrocarbon content than the sublayer adjacent to the substrate.

15. A method of making a recordable element comprising the steps of:

(a) forming a substrate and sputtering on the substrate an optical recording layer including two or more sublayers each containing $Te_a Ge_b C_c H_d O_e$ where a, b, c, d, and e are the atomic percents such that $a+b+c+d+e=100$, and wherein $10 < a < 40$, $10 < b < 60$, $5 < c < 35$, $10 < d < 35$, $e \geq 0$; and (b) depositing by sputtering on the optical recording layer a thin interfacial layer having a thickness in a range of 3 to 30 nm and containing $Ge_w C_x H_y O_z$ where w, x, y, and z are atomic percents such that $w+x+y+z=100$, and wherein $15 < w < 65$, $5 < x < 35$, $15 < y < 40$, $z \geq 0$; forming a light reflective layer over the interfacial layer;

(c) forming a light reflective layer over the interfacial layer; and (d) heat treating the recording element for a time and temperature selected to change its properties so as to improve and stabilize its performance.

16. The method claim 15 where the sublayer adjacent to the interfacial layer is deposited with increased flow of the hydrocarbon gas than the sublayer adjacent to the substrate.

17. A method of making a recordable element comprising the steps of:

(a) forming a substrate and sputtering on the substrate an optical recording layer having a graded composition containing $Te_a Ge_b C_c H_d O_e$ where a, b, c, d, and e are the atomic percents such that $a+b+c+d+e=100$, and wherein $10 < a < 40$, $10 < b < 60$, $5 < c < 35$, $10 < d < 35$, $e \geq 0$;

(b) depositing by sputtering on the optical recording layer a thin interfacial layer having a thickness in a range of 3 to 30 nm and containing $Ge_w C_x H_y O_z$ where w, x, y, and z are atomic percents such that $w+x+y+z=100$, and wherein $15 < w < 65$, $5 < x < 35$, $15 < y < 40$, $z \geq 0$; and (c) forming a light reflective layer over the interfacial layer; and (d) heat treating the recording element for a time and temperature selected to change its properties so as to improve and stabilize its performance.

18. The method of claim 17 where the sublayer adjacent to the substrate is made using a low flow rate of hydrocarbon gas.

19. The method of claim 17 where the sublayer adjacent to the interfacial layer is made using a high flow rate of hydrocarbon gas.

20. The method of claim 17 where the hydrocarbon gas is methane.

21. The method of claim 17 where the reflecting layer includes of Ag, Au, Cu, Al and their alloys.

22. The method of claim 17 where the temperature is greater than 50° C. and time is greater than 4 hours.

23. The method of claim 17 where the substrate is made of polycarbonate or polyacrylate.

* * * * *